United States Patent
Schreurs et al.

(10) Patent No.: US 11,421,064 B2
(45) Date of Patent: Aug. 23, 2022

(54) PROCESS FOR THE PRODUCTION OF MODIFIED POLYETHYLENE MATERIALS

(71) Applicant: SABIC GLOBAL TECHNOLOGIES B.V., Bergen Op Zoom (NL)

(72) Inventors: Franciscus Petrus Hermanus Schreurs, Geleen (NL); Jan Nicolaas Eddy Duchateau, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/051,234

(22) PCT Filed: Apr. 29, 2019

(86) PCT No.: PCT/EP2019/060861
§ 371 (c)(1),
(2) Date: Oct. 28, 2020

(87) PCT Pub. No.: WO2019/214975
PCT Pub. Date: Nov. 14, 2019

(65) Prior Publication Data
US 2021/0238333 A1 Aug. 5, 2021

(30) Foreign Application Priority Data
May 8, 2018 (EP) .................................. 18171145

(51) Int. Cl.
| C08F 10/02 | (2006.01) |
| C08F 255/02 | (2006.01) |
| C08F 8/46 | (2006.01) |
| B29C 48/00 | (2019.01) |
| C08F 222/06 | (2006.01) |
| C08K 5/14 | (2006.01) |
| C08L 23/06 | (2006.01) |

(52) U.S. Cl.
CPC .......... *C08F 255/02* (2013.01); *B29C 48/022* (2019.02); *C08F 222/06* (2013.01); *C08K 5/14* (2013.01); *C08L 23/06* (2013.01); *B29C 2948/92704* (2019.02); *C08L 2205/025* (2013.01); *C08L 2205/03* (2013.01); *C08L 2207/062* (2013.01); *C08L 2207/066* (2013.01)

(58) Field of Classification Search
CPC .......... C08F 255/00; C08F 255/02; C08K 5/14
See application file for complete search history.

(56) References Cited

U.S. PATENT DOCUMENTS

| 3,928,497 A * | 12/1975 | Ohmori .................. C08F 255/02 525/285 |
| 4,506,056 A | 5/1985 | Gaylord |
| 4,927,888 A | 5/1990 | Strait et al. |
| 5,969,050 A | 10/1999 | Vandevijver et al. |
| 6,380,320 B1 | 4/2002 | Wong |

FOREIGN PATENT DOCUMENTS

| CN | 105859970 A | 8/2016 |
| WO | 2017114614 A1 | 7/2017 |
| WO | 2017132338 A1 | 8/2017 |

OTHER PUBLICATIONS

Initiators for High Polymers downloaded from http://www.neochemical.kz/File/Akzo_Data_110407-Initiators_for_High_Polymers.pdf (Year: 2021).*
Luperox 101 product sheet downloaded from https://www.sigmaaldrich.com/specification-sheets/164/116/388092-BULK_ALDRICH_.pdf (Year: 2021).*
International Search Report for International Application No. PCT/EP2019/060861, International Filing Date Apr. 29, 2019, dated Aug. 22, 2019, 6 pages.
Lloyd, L., "Olefin Polymerization Catalysts"; Handbook of Industrial Catalysts, 2011, pp. 311-350.
Written Opinion for International Application No. PCT/EP2019/060861, International Filing Date Apr. 29, 2019, dated Aug. 22, 2019, 7 pages.
Oliphant et al, "Melt giafling of a basic monomer on the polyethylene in a twin-screw extruder: reaction kinetics", Polymer, Elsevier Science Publishers B.V., vol. 36, No. 8, Jan. 1, 1995, pp. 1597-1603.

* cited by examiner

*Primary Examiner* — Irina S Zemel
*Assistant Examiner* — Jeffrey S Lenihan
(74) *Attorney, Agent, or Firm* — Cantor Colburn LLP

(57) ABSTRACT

The present invention relates to a process for the production of modified polyethylene comprising adding a free radical initiator composition and a polar monomer in extrusion of polyethylene materials with a melt mass flow rate (MFR) as determined in accordance with ISO 1133-1 (2011) at 190° C. under a load of 2.16 kg of between 0.5 and 75 g/10 min characterized in that the free radical initiator composition is added in quantities between 0.01 wt % to 5 wt % compared to the total weight of the polyethylene material wherein the extrusion is performed at a temperature between 230° C. and 350° C. Such process allows for the production of modified polyethylenes, such as having an amount of grafted polar monomer, such as maleic anhydride, of >3 wt %, with low amount of free, unreacted monomer whilst maintaining or not significantly modifying melt properties such as melt mass flow rate.

19 Claims, No Drawings

PROCESS FOR THE PRODUCTION OF MODIFIED POLYETHYLENE MATERIALS

CROSS REFERENCE TO RELATED APPLICATIONS

This application is a National Stage application of PCT/EP2019/060861, filed Apr. 29, 2019, which claims the benefit of European Application No. 18171145.8, filed May 8, 2018, both of which are incorporated by reference in their entirety herein.

The present invention relates to a process for the production of modified polyethylene. Polyethylenes are well known materials for the production of a wide variety of products. Polyethylenes are thereby apolar and not compatible with polar materials.

To improve the compatibility with polar materials polyethylenes can be grafted for example with maleic anhydride. Such polyethylenes with increased polarity are thereby known for example from U.S. Pat. No. 4,506,056. Doing so however is known to lead to degradation and/or cross-linking. Nevertheless, there is an ongoing need to develop further processes that are simple and/or allow to achieve high amounts of grafted compounds and/or minimize degradation/deterioration and/or cross-linking.

This objective has now been achieved according to the present invention by a process for the production of modified polyethylene comprising adding a free radical initiator composition and a polar monomer to extrusion of polyethylene materials having a melt mass flow rate (MFR) as determined in accordance with ISO 1133-1 (2011) at 190° C. under a load of 2.16 kg of between 0.5 and 75 g/10 min, preferably between 1 to 50 g/10 min, more preferably 2 to 40 g/10 min, in an extruder, wherein the free radical initiator composition is added in quantities of between 0.01 wt % to 5 wt % compared to the total weight of the polyethylene materials.

It is particularly preferred that in the process according to the present invention the temperature of the polyethylene materials present in the extruder at the position of feeding of the free radical initiator is such that the half-life time of the free radical initiator at that temperature is >5 and <600 seconds, wherein the half-life time is determined according to the formula I:

$$t_{1/2} = \frac{\ln 2}{A \cdot e^{-\frac{E_a}{RT}}} \quad \text{Formula I}$$

in which:
$t_{1/2}$ is the half-life time in s;
A is the Arrhenius frequency factor in $s^{-1}$;
$E_a$ is the activation energy for the dissociation of the initiator in J/mol;
R is the universal gas constant 8.3142 J/(mol·K);
T is the temperature in K,
wherein the half-life time presents the time by which at least half of the molecules of the free radical initiator have decomposed.

Preferably, the temperature of the polyethylene materials present in the extruder at the position of feeding of the free radical initiator is such that the half-life time of the free radical initiator at that temperature is >30 and <600 seconds, more preferably >60 and <400 seconds, even more preferably >100 and <300 seconds.

By controlling the half-life time of the free radical initiator in such way, so by selecting a free radical initiator that complies with the half-life time as set our above at the particular temperature at which the free radical initiator contacts the polyethylene materials, the modification reaction is controlled such that a desirable high level of grafting of the polar monomer can be achieved, particularly whilst retaining or only moderately affecting the melt flow properties of the polyethylene.

In such process, a modified polyethylene may be produced that contains a high loading of the polar monomer, for example maleic anhydride, that is grafted onto it. Such modified polyethylene may be used as a masterbatch to combine with other thermoplastic materials, which may also be polyethylenes, to obtain a material formulation with a certain (lower) quantity of the grafted polar monomer, but which may be produced in a manner that only a limited fraction of the material in that formulation has to be subjected to a modification process, namely only that fraction of material that is resulting from the process of the present invention. Being able to manufacture and use such high loaded masterbatch increases the flexibility of designing material formulations, and contributes to overall process economics since the fraction that has to undergo the extra modification step is reduced. By so, the overall energy consumption of a process for manufacturing such material formulations is reduced, as the total weight of material that is subjected to the manufacturing process, which is typically performed via melt extrusion, is reduced.

Further preferably, the temperature of the polyethylene materials present in the extruder at the position of feeding of the free radical initiator is such that the half-life time of the free radical initiator at that temperature is >30 and <600 seconds, more preferably >60 and <400 seconds, even more preferably >100 and <300 seconds, wherein the temperature of the polyethylene materials in the extruder at the position of feeding of the free radical initiator is >160° C. and <320° C., preferably >180° C. and <300° C., more preferably >200° C. and <280° C., even more preferably >200° C. and <260° C.

Alternatively, the temperature of the polyethylene materials present in the extruder at the position of feeding of the free radical initiator is such that the half-life time of the free radical initiator at that temperature is >5 and <60 seconds, more preferably >5 and <30 seconds, wherein the temperature of the polyethylene materials in the extruder at the position of feeding of the free radical initiator is >160° C. and <320° C., preferably >180° C. and <300° C., more preferably >200° C. and <280° C., even more preferably >200° C. and <260° C.

Preferably, the extruder has a length L extending in downstream direction from an inlet where the polyethylene material is fed to the extruder to an outlet where the modified polyethylene is removed from the extruder, wherein the segment between 0.3-0.7 L and 1 L, preferably between 0.30-0.5 L and 1 L, in downstream direction, forms a reaction zone, wherein the temperature of the material in the extruder in the reaction zone is between 230° C. and 350° C., more preferably between 240° C. and 330° C., even more preferably between 250° C. and 320° C., and/or wherein the temperature of the material in the extruder at the outlet is between 230° C. and 350° C., more preferably between 240° C. and 330° C., even more preferably between 250° C. and 320° C.

The invention may thereby especially allow for a simple process, especially a process not requiring additional compounds, and/or a process that may achieve high amounts of grafted polar monomers and/or a process that may minimize degradation/deterioration and/or cross-linking.

Polyethylene materials may for example comprise or consist of low-density polyethylenes, linear low-density polyethylenes and/or high-density polyethylenes.

Low-density polyethylenes, also referred to as LDPE, may for example have a density as determined according to ISO 1183-1 (2012), method A of ≥900 and ≤930 kg/m$^3$. Low-density polyethylenes may for example be produced via high-pressure radical polymerization processes. Such high-pressure radical polymerization processes may for example be autoclave processes or tubular processes. Such processes are for example described in Nexant PERP report 2013-2 'Low Density Polyethylene'.

For example, such high-pressure free radical polymerisation process comprise more than one of said autoclave reactors and/or said tubular reactors, for example positioned in series. For example, such high-pressure free radical polymerisation process comprise two reactors in series. For example, the process may comprise a first polymerisation in an autoclave reactor and a further polymerisation in a tubular reactor. Alternatively, the process may comprise a first polymerisation in a tubular reactor and a further polymerisation in an autoclave reactor. Alternatively, the process may comprise a first polymerisation in a tubular reactor and a further polymerisation in a further tubular reactor. Alternatively, the process may comprise a first polymerisation in an autoclave reactor and a further polymerisation in an autoclave reactor.

Low-density polyethylenes may for example be obtained by polymerizing ethylene as monomer, optionally in the presence of one or more comonomers. For example, such comonomers may include 1-butene, 1-pentene, 4-methyl-1-pentene, 1-hexene, 1-heptene and/or 1-octene, bifunctional α,ω-alkadienes such as for example 1,4-hexadiene, 1,7-octadiene, 1,9-decadiene and/or 1,13-tetradecadiene, di(meth)acrylates such as 1,4-butanedioldi(meth)acrylate, hexanediol di(meth)acrylate, 1,3-butylene glycoldi(meth)acrylate, ethylene glycol di(meth)acrylate, dodecanediol di(meth)acrylate, trimethylol propane tri(meth)acrylate and/or tri(meth)acrylate ester, vinyl acetate, hydroxyethyl (meth)acrylate, hydroxypropyl (meth)acrylate, maleic acid, fumaric acid, itaconic acid, acrylic acid, methacrylic acid, crotonic acid, methyl methacrylate, ethyl methacrylate, n-butyl methacrylate, tert-butyl methacrylate, methyl acrylate, ethyl acrylate, n-butyl acrylate, 2-ethylhexyl acrylate, tert-butyl acrylate, methacrylic anhydride, maleic anhydride, itaconic anhydride.

For example, such comonomers may be present in quantities of ≤40.0% by weight, alternatively ≤30.0% by weight, alternatively ≤15.0% by weight, alternatively ≤10.0% by weight, alternatively ≤5.0% by weight, alternatively ≤3.0% by weight, compared to the total weight of the low-density polyethylene. For example, such comonomers may be present in quantities of ≥0.05% by weight, alternatively ≥0.10% by weight, alternatively ≥0.30% by weight, alternatively ≥0.50% by weight, alternatively ≥1.00% by weight, compared to the total weight of the low-density polyethylene. For example, such comonomers may be present in quantities of ≥0.05% and ≤40.0 by weight, alternatively ≥0.10% and ≤10.0% by weight, alternatively ≥0.30% and ≤3.0% by weight, compared to the total weight of the low-density polyethylene.

Linear low-density polyethylenes, also referred to as LLDPE, may for example have a density as determined according to ISO 1183-1 (2012), method A of between 850 kg/m$^3$ and 945 kg/m$^3$, preferably between ≥910 kg/m$^3$ and ≤940 kg/m$^3$. Linear low-density polyethylenes may for example be polyethylene elastomers or polyethylene plastomers.

High-density polyethylenes, also referred to as HDPE, may for example have a density as determined according to ISO 1183-1 (2012), method A of >940 kg/m$^3$ and ≤970 kg/m$^3$.

In an embodiment, the present invention relates to a process wherein the polyethylene material may comprise for example one or more of a low-density polyethylene, a linear low-density polyethylene or a high-density polyethylene, or mixtures thereof.

In a further embodiment, the invention relates to a process wherein the polyethylene material may comprise for example one or more of a linear low-density polyethylene having a density of ≥850 kg/m$^3$ and ≤935 kg/m$^3$, a low-density polyethylene having a density of ≥915 kg/m$^3$ and ≤935 kg/m$^3$, a high-density polyethylene having a density of ≥936 kg/m$^3$ and ≤970 kg/m$^3$, or mixtures thereof, the density determined according to ISO 1183-1 (2012), method A.

In a further embodiment, the invention relates to a process according wherein the polyethylene material comprises ≥50%, preferably >75%, further preferred >90%, further preferred >95%, by weight of a low-density polyethylene, a linear low-density polyethylene or a high-density polyethylene, or mixtures thereof, compared to the total weight of the polyethylene material.

In a further embodiment, the invention relates to a process wherein the MFR (2.16 kg 190° C.) of the polyethylene material may be between 1 to 50 g/10 min, preferably 2 to 40 g/10 min as measured according to ISO 1133-1 (2011).

In another embodiment, the invention relates to a process wherein the polyethylene material may comprise for example ≥10.0% by weight of a low-density polyethylene, a linear low-density polyethylene or a high-density polyethylene, or mixtures thereof, compared to the total weight of the polyethylene material.

Linear low-density polyethylenes and/or high-density polyethylenes may for example be obtained by polymerizing ethylene as monomer, optionally in the presence of one or more comonomers, in a slurry polymerization process, a gas phase polymerization process or a solution polymerization process, or combinations thereof. The slurry, gas phase and solution polymerization processes may be catalytic polymerization processes. Such catalytic polymerization processes are commonly operated at reaction pressures of up to 1 MPa. The catalytic polymerization processes may be operated using for example Ziegler-Natta catalyst systems, chromium-based Phillips type catalyst systems, metallocene catalysts systems, or any other catalyst system known in the art of ethylene homo- or copolymer production. Such catalyst systems are described in for example Lloyd, L., 'Olefin Polymerization Catalysts', in 'Handbook of Industrial Catalysts', p. 311-350, ISBN: 978-0-387-24682-6, 2011.

As comonomers, for example one or more α-olefins may be used. The one or more α-olefin comonomers may for example be one or more selected from the group of α-olefins having ≥3 and ≤10 carbon atoms. Preferably the one or more α-olefin comonomers comprises an acyclic α-olefin. For example, the one or more α-olefin comonomers may be one or more selected from 1-butene, 1-pentene, 4-methyl-1-pentene, 1-hexene, 1-heptene and/or 1-octene.

In case an α-olefin comonomer is used in the polymerisation, the one or more α-olefin comonomers may for example be present in an amount of ≤10.0% by weight, alternatively ≤8.0% by weight, alternatively ≤5.0% by weight, alternatively ≤4.0% by weight, alternatively ≤3.0% by weight, alternatively ≤2.0% by weight, alternatively ≤1.0% by weight, alternatively ≤0.5% by weight, compared to the total weight of the monomers.

In case an α-olefin comonomer is used in the polymerisation, the one or more α-olefin comonomers may for example be present in an amount of ≥0.01% by weight, alternatively 0.05% by weight, alternatively ≥0.10% by weight, compared to the total weight of the monomers.

For example, in case an α-olefin comonomer is used in the polymerisation, the one or more α-olefin comonomers may be present in an amount of ≥0.01% and ≤10.0% by weight, alternatively ≥0.05 and ≤5.0% by weight, compared to the total weight of the monomers.

In an embodiment, the linear low-density polyethylenes or high-density polyethylenes may for example be produced in a solution polymerisation process. A solution polymerisation process for the production of linear low-density polyethylenes in accordance with the present invention is to be understood to be a process in which the polymerisation is performed at for example a temperature in the range of 150-330° C., at for example a pressure in the range of 2.0-15.0 MPa, in which the reaction takes place in a an inert solvent, in which the inert solvent for example has a boiling point below the reaction temperature. For example, said solution polymerisation process is a continuous process.

In an embodiment, the linear low-density polyethylenes or high-density polyethylenes may for example be produced in a slurry polymerisation process. A slurry polymerisation process for the production of linear low-density polyethylenes in accordance with the present invention is to be understood to be a process in which the polymerisation is performed at for example a temperature in the range of 70-90° C., at for example a pressure in the range of 0.3-5.0 MPa, in which the reaction takes place in an inert diluent, in which said diluent is for example a hydrocarbon which is inert during the polymerisation process and which is in a liquid phase under the conditions occurring in the polymerisation process. For example, said diluent may be hexane. For example, said slurry polymerisation process is a continuous process.

In an embodiment, the linear low-density polyethylenes or high-density polyethylenes may for example be produced in a gas-phase polymerisation process. In an embodiment, the linear low-density polyethylenes or high-density polyethylenes may for example be produced in a gas-phase fluidized bed polymerisation process. A gas-phase polymerisation process for the production of linear low-density polyethylenes or high-density polyethylenes in accordance with the present invention is to be understood to be a process in which the polymerisation is performed in a reactor in which the polymerisation reaction takes place in a gaseous phase.

Polyethylene materials according present invention may for example be polyethylene materials directly obtained from a polymerization process, or polyethylene materials comprising additional ingredients such as for example additives. Alternatively, the additives may for example be added during the extrusion. Examples of suitable additives include but are not limited to the additives usually used for polyethylene materials, for example antioxidants, nucleating agents, acid scavengers, processing aids, lubricants, surfactants, blowing agents, ultraviolet light absorbers, antistatic agents, slip agents, anti-blocking agents, antifogging agents, pigments, dyes and fillers. The additives may be present in the typically effective amounts well known in the art, such as 0.001 weight % to 10 weight % based on the total composition.

Suitable antioxidants may for example include one or more of phenolic antioxidants, phosphites or phosphonites.

Such phenolic antioxidants may for example include one or more of octadecyl 3,5-di-t-butyl-4-hydroxyhydrocinnamate, 3-(3,5-di-t-butyl-4-hydroxyphenyl)propionic acid methyl ester, 3-(3,5-di-t-butyl-4-hydroxyphenyl)propionic acid, 2,4,6-tris-t-butyl phenol, 1,6-hexamethylene bis(3,5-di-t-butyl-4-hydroxyhydrocinnamate), pentaerythritol tetrakis(3,5-d i-t-butyl-4-hydroxyphenyl)propionate, ethylenebis(oxyethylene)bis(3-t-butyl-4-hydroxy-5-methylhydrocinnamate), hexamethylenebis(3,5-di-t-butyl-4-hydroxycinnamate), thiodiethyl bis(3,5-di-t-butyl-4-hydroxyphenyl)propionate, tris(3,5-di-t-butyl-4-hydroxybenzyl)isocyanurate, (3-(3,5-di-t-butyl-4-hydroxyphenyl)propionic-1,3,5-tris(2-hydroxyethyl)) isocyanurate ester, 1,3,5-trimethyl-2,4,6-tris(3,5-di-t-butyl-4-hydroxyphenyl)benzene, 3-(3,5-dt-t-butyl-4-hydroxyphenyl)propionic acid methyl ester.

Such phosphites or phosphonites may for example include one or more of triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl) pentaerythritol diphosphite, bis(2,6-di-tert-butyl-4-methylphenyl) pentaerythritol diphosphite, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite Suitable acid scavengers may for example include one or more of zinc oxide, hydrotalcites, hydroalumites, and/or metallic stearates such as calcium stearate, zinc stearate, sodium stearate.

A polar monomer to be added to the polyethylene material according to the invention may for example be according to Formula 1 below:

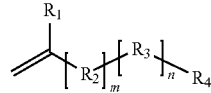

Formula 1 wherein
R1 may be selected from —H or —CH₃;
R2 may be selected from —O—, —(CO)—(NH)— or —(CO)—O—;
R3 may be an organic group, especially for example a linear or branched alkane or —CH₂—CHR4-[O—CH₂—CHR4]$_q$—, wherein q≥1 and ≤10 comprising 1-30 carbon atoms;
R4 is —OH, —NH₂, —N(CH₃)₂, —N(CH₂—CH₃)₂, —N[CH(CH₃)₂]₂, —NH[C(CH₃)₃],

—NCO, —CF$_3$, —CH(CF$_3$)$_2$, —(CF$_2$)$_p$—CF$_3$, —Si[OSi (CH$_3$)$_3$]$_3$ and —OSi(CH$_3$)$_3$, m=0 or 1; and n≥1 and ≤10; and p≥1 and ≤10 or mixtures of two or more of such compounds.

R3 in Formula 1 above may thereby especially for example be selected from the group consisting of:

linear or branched alkane;

—CH$_2$—CHR4[O—CH$_2$—CHR4]$_q$-, wherein q≥1 and ≤10, and each R4 individually may be selected from CH$_3$ and H; and —CH$_2$—CH(OH)—CH$_2$—.

Alternatively, a polar monomer may for example also be an α,β-unsaturated-carboxylic acid with 3 to 8 carbon atoms, in particular maleic acid, fumaric acid, itaconic acid, acrylic acid, methacrylic acid and crotonic acid, or an anhydride, in particular methacrylic anhydride, maleic anhydride or itaconic anhydride, or a mixture of two or more thereof. In a particularly preferred embodiment, the polar monomer may for example be maleic anhydride.

A polar monomer to be added to the polyethylene material according to the invention may for example be at least one or more acrylate(s) and/or methacrylate(s) preferably comprising at least 3 heteroatoms selected from O, N or S. A polar monomer to be added to the polyethylene material according to the invention may be at least a mixture of two or more acrylates and/or methacrylates, preferably comprising at least 3 heteroatoms selected from O, N or S.

A polar monomer to be added to the polyethylene material according to the invention may preferably comprise at least one or more thiol, alcohol, acid or amine function, which may optionally have been deprotonated and/or converted to a salt.

A polar monomer may for example especially be selected from: 2-hydroxyethyl acrylate, 2-hydroxyethyl methacrylate, 3-hydroxypropyl acrylate, 3-hydroxypropyl methacrylate, 2-hydroxypropyl acrylate, 2-hydroxypropyl methacrylate, 2,3-dihydroxypropyl acrylate, 2,3-dihydroxypropyl methacrylate, 4-hydroxybutyl acrylate, 4-hydroxybutyl methacrylate, poly(propylene glycol) monoacrylate, poly(propyleneglycol) monomethacrylate, poly(ethylene glycol) monoacrylate, poly(ethylene glycol) monomethacrylate, poly(ethylenepropyleneglycol) monomethacrylate, 2-hydroxyethyl vinyl ether, 2-(dimethylamino)ethyl methacrylate, 2-(diethylamino)ethyl methacrylate, 2-(diethylamino)ethyl acrylate, 2-(dimethylamino)ethyl acrylate, 2-aminoethyl methacrylate hydrochloride, 2-aminoethyl acrylate hydrochloride, N-[3-(dimethylamino)propyl]methacrylamide, N-[3-(dimethylamino)propyl]acrylamide, 2-(diisopropylamino)ethyl methacrylate, 2-(diisopropylamino)ethyl acrylate, 2-(tert-butylamino)ethyl methacrylate, 2-(tert-butylamino)ethyl acrylate, 3-(dimethylamino)propyl acrylate and 3-(dimethylamino)propyl methacrylate or mixtures of two or more thereof.

A polar monomer may for example preferably be selected from: 2-(dimethylamino)ethyl methacrylate, 2-(diethylamino)ethyl methacrylate, 2-(diethylamino)ethyl acrylate, 2-(dimethylamino)ethyl acrylate, 2-aminoethyl methacrylate hydrochloride, 2-aminoethyl acrylate hydrochloride, N-[3-(dimethylamino)propyl]methacrylamide, N-[3-(dimethylamino)propyl]acrylamide, 2-(diisopropylamino)ethyl methacrylate, 2-(diisopropylamino)ethyl acrylate, 2-(tert-butylamino)ethyl methacrylate, 2-(tert-butylamino)ethyl acrylate, 3-(dimethylamino)propyl acrylate and 3-(dimethylamino)propyl methacrylate or mixtures of two or more thereof.

The polar monomer may for example be added in quantities between 0.1 to 10 wt %, preferably 1 to 7 wt %, further preferred 2 to 6 wt % compared to the total weight of the polyethylene material.

The polar monomer may be added as a gas and/or solid and/or as a liquid, including in the melt, and/or as a solution, optionally under pressure.

The polar monomer may be added to the extrusion unit in a stage where the polyethylene material is molten or in a solid state.

The polar monomer may be added together with the polyethylene material or separately, preferably for example in the lowest temperature zone (the zone with the lowest temperature setting) of an extrusion unit.

The polar monomer and/or the free radical initiator composition may be added to an extrusion unit, like an extruder, preferably in the melt zone. The melt zone is a zone in the extrusion unit that may follow the feed zone starting from the inlet of the polyethylene material in the extrusion unit and may be the zone of the extrusion unit in which the polyethylene material may preferably be molten. The melt zone may thus be further away from the inlet of polyethylene material compared to the feed zone, which may be the zone of the extrusion unit which is the closest to the inlet of the polyethylene material and/or where the temperature is not sufficient to melt the polyethylene material. Alternatively, the polar monomer and/or the free radical initiator composition may for example be added to an extrusion unit, like an extruder, in the feed zone, preferably for example either together with or separately from the polyethylene material. The feed zone of the extrusion unit may thereby be the first zone in the extrusion unit starting from the inlet of the polyethylene material in the extrusion unit and/or in which the polyethylene material may preferably not yet be molten and/or that has the lowest temperature setting of the extrusion unit The polar monomer may be added to an extrusion unit, like an extruder, preferably wherein the temperature of the polyethylene materials present in the extruder at the position of feeding of the polar monomer is above the melting temperature of the polyethylene material, such as between 140° C. and 350° C., further preferred between 150° C. and 300° C. or between 180° C. and 230° C.

The free radical initiator composition may be added to an extrusion unit, like an extruder, preferably wherein the temperature of the polyethylene materials present in the extruder at the position of feeding of the free radical initiator is above the melting temperature of the polyethylene material, such as between 140° C. and 350° C., further preferred between 150° C. and 300° C. or between 180° C. and 230° C.

The polar monomer may thereby for example be fed to the extrusion unit at an inlet that is different from the inlet used to feed the free radical initiator composition. Preferably, the polar monomer is thereby fed to the extrusion unit before feeding the free radical initiator composition, preferably at an inlet of the extrusion unit located closer to the inlet of the polyethylene material.

In an embodiment, the invention relates to a process wherein the free radical initiator composition may for example comprise at least one free radical initiator selected from:

dialkyl peroxides including dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide;

cyclic peroxides including 3,6,9-triethyl-3,6,9-trimethyl-1,4,7-triperoxononane, 3,3,5,7,7-pentamethyl-1,2,4-trioxepane; or hydroperoxides including isopropylcumyl hydroperoxide, 1,1,3,3-tetramethylbutyl hydroperoxide, cumyl hydroperoxide, tert-butyl hydroperoxide, tert-amyl hydroperoxide;

and/or mixtures thereof.

In the context of the present invention, a free radical initiator composition is to be understood to be a compound that is capable of forming free radicals when subjected to conditions occurring in the extrusion unit. The free radical initiator composition may for example comprise one or more selected from organic peroxides, azides or azo compounds. Suitable organic peroxides may for example include diacyl peroxides, dialkyl peroxides, peroxymonocarbonates, peroxydicarbonates, peroxyketals, peroxyesters, cyclic peroxides, hydroperoxides. Suitable azo compounds may for example include 2,2'-azodi(isobutyronitrile), 2,2'-azodi(2-methylbutyronitrile), 1,1'-azodi(hexahydrobenzonitrile). Suitable azides may for example include organic azides such as 4-acetamidobenzene sulfonyl azide, 1-azidoadamantane, 4-azidoaniline, azidomethyl phenyl sulfide, 2-azido-4-octadecene-1,3-diol, 5-azidopentanoic acid, 3-azido-1-propanamine, 3-azido-1-propanol, 2,6-bis-(4-azidobenziliden)-4-methylcyclohexanone, ethyl azidoacetate, 4-methoxybenzyloxycarbonyl azide.

Examples of suitable diacyl peroxides are diisobutyryl peroxide, di(3,5,5-trimethylhexanoyl) peroxide, dilauroyl peroxide, didecanoyl peroxide, dibenzoyl peroxide.

Examples of suitable dialkyl peroxides are dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, di-tert-butyl peroxide, di-isononanoyl peroxide, di-tert-amyl peroxide, didecanoyl peroxide.

In an embodiment, the free radical initiator composition may for example comprise 2,5-dimethyl-2,5-di(tert-butylperoxy)hexane.

Examples of suitable peroxymonocarbonates are tert-amylperoxy 2-ethylhexyl carbonate, tert-butylperoxy isopropyl carbonate, tert-butylperoxy 2-ethylhexyl carbonate.

Examples of suitable peroxydicarbonates are di(3-methoxybutyl)peroxydicarbonate, di-sec-butyl peroxydicarbonate, diisopropyl peroxydicarbonate, di(4-tert-butylcyclohexyl) peroxydicarbonate, di(2-ethylhexyl) peroxydicarbonate, dibutyl peroxydicarbonate, diacetyl peroxy dicarbonate, dimyristyl peroxydicarbonate, dicyclohexyl peroxydicarbonate.

Examples of suitable peroxyketals are 1,1-di(tert-butyl peroxy)-3,5,5-trimethylcyclohexane, 1,1-di(tert-amyl peroxy)cyclohexane, 1,1-di(tert-butyl peroxy)cyclohexane, 2,2-di(tert-butyl peroxy)butane, butyl 4,4-di(tert-butyl peroxy)valerate, n-ethyl-4,4-di-(tert-butylperoxy)valerate, ethyl-3,3-di(tert-butylperoxy)butyrate, ethyl-3,3-di(tert-amylperoxy)butyrate.

Examples of suitable peroxyesters are cumyl peroxyneodecanoate, 1,1,3,3,-tetramethylbutylperoxyneodecanoate, cumyl peroxyneoheptanoate, tert-amyl peroxyneodecanoate, tert-butyl peroxyneodecanoate, tert-butyl peroxyisononanoate, tert-butyl permaleate, tert-butyl peroxydiethylisobutyrate, 1,1,3,3-tetramethylbutyl peroxypivalate, tert-butyl peroxyneoheptanoate, tert-amyl peroxypivalate, tert-butyl peroxypivalate, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, tert-butyl peroxy-2-ethylhexanoate, tert-butyl peroxydiethylacetate, tert-butyl peroxyisobutyrate, tert-amyl peroxyacetate, tert-butyl peroxy-3,5,5-trimethylhexanoate, tert-amyl peroxybenzoate, tert-butyl peroxyacetate, tert-butyl peroxybenzoate.

Examples of suitable cyclic peroxides are 3,6,9-triethyl-3,6,9-trimethyl-1,4,7-triperoxononane, 3,3,5,7,7-pentamethyl-1,2,4-trioxepane, 3,3,6,6,9,9,-hexamethyl-1,2,4,5-tetraoxacyclononane.

Examples of suitable hydroperoxides are isopropylcumyl hydroperoxide, 1,1,3,3-tetramethylbutyl hydroperoxide, cumyl hydroperoxide, tert-butyl hydroperoxide, tert-amyl hydroperoxide, methyl isobutyl ketone hydroperoxide, di-isopropyl hydroxyperoxide, hydrogen peroxide.

In an embodiment, the free radical initiator composition may for example comprise a free radical initiator that has a half-life time at 150° C. of >175 minutes, preferably >200 minutes. In an embodiment, the free radical initiator composition may for example comprise a free radical initiator that has a half-life time at 150° C. of <300 minutes, preferably <250 minutes. Preferably, the free radical initiator composition may for example comprise a free radical initiator that has a half-life time at 150° C. of between >175 minutes and <300 minutes, further preferred between >200 minutes and <250 minutes. Free radical initiators having such half-life time may be reactive over the whole of the extrusion.

The half-life time is determined according to the formula I:

$$t_{1/2} = \frac{\ln 2}{A \cdot e^{-\frac{E_a}{RT}}} \qquad \text{Formula I}$$

In which:

$t_{1/2}$ is the half-life time in s;

A is the Arrhenius frequency factor in $s^{-1}$;

$E_a$ is the activation energy for the dissociation of the initiator in J/mol;

R is the universal gas constant 8.3142 J/mol·K;

T is the temperature in K.

The half-life time presents the time by which at least half of the molecules of the free radical initiator have decomposed.

Examples of such free radical initiator having such half-life time at 150° C. include dialkyl peroxides such as for example hydroperoxides such as for example 1,1,3,3-tetramethylbutyl hydroperoxide or cumyl hydroperoxide.

The free radical initiator composition may for example be fed to the extrusion unit of the polyethylene material at a single feed inlet. Alternatively, the free radical initiator composition may for example be fed to the extrusion unit of the polyethylene material at multiple feed inlets. In case multiple feed inlets are used, the composition of the free radical initiator composition of the first feed inlet may for example be the same as the composition of the free radical initiator composition of the second and further feed inlets. Alternatively, the composition of the free radical initiator composition may for example at each feed inlet be the same or different than the composition of the free radical initiator composition at each of the other inlets. Use of different compositions of free radical initiator compositions at different feed inlets of the extrusion unit enables the reduction of gel content of the polyethylene material by selection of the appropriate free radical initiators.

In an embodiment, the free radical initiator composition may for example be fed to the extrusion unit at a first feed inlet and/or at least a second feed inlet, wherein said first feed inlet is positioned in a zone of the extrusion unit where the polyethylene material is not in a molten state, and wherein said second feed inlet is positioned in a zone of the extrusion unit where the polyethylene material is in a molten state. For example, in case the free radical initiator composition is fed to the extrusion unit at a first feed inlet and at least a second feed inlet, wherein said first feed inlet is positioned in a zone of the extrusion unit where the polyethylene material is not in a molten state, and wherein said second feed inlet is positioned in a zone of the extrusion unit where the polyethylene material is in a molten state, the composition of the free radical initiator composition that is fed at said first feed inlet may for example be different from the composition of the free radical initiator composition that is fed at said second feed inlet.

For example, in case the free radical initiator composition is fed to the extrusion unit at a first feed inlet and at least a second feed inlet, wherein said first feed inlet is positioned in a zone of the extrusion unit where the polyethylene material is not in a molten state, and wherein said second feed inlet is positioned in a zone of the extrusion unit where the polyethylene material is in a molten state, the composition of the free radical initiator composition that is fed at said first feed inlet may for example comprise a quantity of free radical initiator having a half-life time at 190° C. that is longer than the half-life time at 190° C. of that free radical initiator in the free radical initiator composition that is fed at said second feed inlet having the longest half-life time at 190° C. of the free radical initiators in the free radical composition that is fed at said second feed inlet.

The free radical initiator composition and/or the polar monomer may for example be fed in a solid form. Alternatively, the free radical initiator composition and/or the polar monomer may for example be fed in a liquid form. Alternatively, the free radical initiator composition and/or the polar monomer may for example be fed as a solution. Examples of solvents that may be used are organic solvents such as non-polar organic solvents including pentane, cyclopentane, hexane, cyclohexane, decane, benzene, toluene and/or polar organic solvents including tetrahydrofuran, ethyl acetate, acetone, dimethylformamide, acetonitrile, propylene carbonate, formic acid, n-butanol, isopropanol, n-propanol, ethanol, methanol, acetic acid.

In an embodiment, the invention relates to a process wherein the free radical initiator composition may comprise for example at least one free radical initiator and a solvent and/or wherein the polar monomer may comprise for example at least one polar monomer and a solvent.

The free radical composition may for example comprise ≥5.0% by weight, alternatively ≥10.0% by weight, alternatively ≥15.0% by weight, alternatively ≥20.0% by weight, alternatively ≥25.0% by weight of free radical initiator, compared to the total weight of the free radical initiator composition. According to the invention the free radical composition may also not comprise a solvent and/or comprise 100% by weight of free radical initiator.

In an embodiment, the invention relates to a process wherein the free radical initiator composition may for example be added in quantities between 0.005 wt % and 1 wt %, preferably between 0.075 wt % and 0.5 wt %, further preferred between 0.08 wt % and 0.3 wt %, compared to the total weight of the polyethylene material.

In the context of the present invention, extrusion may be understood to be a method of processing of a polyethylene material by bringing the material in a molten condition in an extruder, allowing the material to be preferably homogeneously mixed and allowing further ingredients to be mixed into the polyethylene material whilst that polyethylene material is in molten condition.

Such extrusion may for example be performed in an extrusion unit. In an embodiment, the polyethylene material is fed to the extrusion unit under an atmosphere that is free from oxygen, for example under an atmosphere that contains ≤ 0.1% by weight of oxygen, compared to the total weight of the atmosphere. For example, the polyethylene material is fed to the extrusion unit under a nitrogen atmosphere.

In an embodiment, the invention relates to a process wherein the temperature of the material in the extruder in the reaction zone and/or the temperature of the material in the extruder at the outlet may for example between 240° C. and 330° C., preferably between 250° C. and 320° C.

Such extrusion may for example be performed in an extrusion unit such as an extruder. Such an extruder may for example be a single-screw extruder. Such an extruder may for example be a twin-screw extruder. Such extrusion unit may comprise multiple extruders positioned in series.

The free radical initiator composition may be added to the extrusion unit in a position where the free radical initiator composition is mixed with the polyethylene material where the polyethylene material is in a solid state. Alternatively, the free radical initiator composition may be added to the extrusion unit in a position where the polyethylene material is in a molten state.

In case the extrusion of the polyethylene material is performed in an extruder, the free radical initiator composition may be added to the extruder in the feed zone. The feed zone of the extruder is the first zone in the extruder, from the inlet of the first polyethylene material in the extruder, in which the polyethylene material is not yet in a molten condition. In case the extrusion of the polyethylene material is performed in an extruder, the free radical initiator composition may be added to the extruder in the melt zone. The melt zone is the zone in the extruder subsequent to the feed zone, in which the polyethylene material is molten.

The free radical initiator composition may be added in such way that it does not lead to changes in the melt properties of the polyethylene material, such as for example the melt mass flow rate as measured in accordance with ISO 1133-1 (2011) at 190° C. and a load of 2.16 kg.

In an embodiment, the invention relates to a process wherein the extrusion may for example be performed in an extrusion unit, wherein the free radical initiator composition is dosed to the extrusion unit in a stage where the polyethylene material is in a molten condition or in a solid state.

The modified polyethylenes obtained according to the process of the present invention may for example be used in the production of films. In a certain embodiment, the present invention also relates to a film comprising a modified polyethylene produced according to the process of the present invention. In particular, an embodiment of the invention relates to a multilayer film comprising a layer comprising a modified polyethylene produced according to the process of the present invention.

The invention will now be illustrated by the following non-limiting examples.

Experiment I: Modification of the Polyethylenes with Free Radical Initiator and Polar Monomer In a twin screw extruder with a screw diameter of 27 mm, a quantity of polyethylene was fed under a nitrogen atmosphere. A quantity of polar monomer composition was dosed a 57 wt % solution of maleic anhydride in acetone. After that the free radical initiator composition was dosed as a 5 wt % solution of cumyl hydroperoxide in acetone. The polyethylene, polar monomer and the free radical initiator were melt mixed in the extruder, which was set to ensure a temperature of the polyethylene melt as indicated in Table I below. The extruder was operated at a screw speed of 400 RPM, and fed with such quantities of polyethylene, polar monomer and free radical initiator feed to ensure a throughput of 7 kg/h.

The polar monomer and free radical initiator were dosed to the extruder in the melt zone (the zone subsequent to the feed zone, in which the polyethylene is in a molten condition).

The polyethylenes that were used and the quantity of polar monomer and free radical initiator that was used in the examples are presented in Table I.

TABLE I

| Ex. | Polyethylene | Free radical initiator quantity (wt %) | Wt % polar monomer | Set Temperature | Conversion | MFR (2.16 190° C.) after reaction |
|---|---|---|---|---|---|---|
| I | A | 0.15 | 2.5 | 280° C. | 100% | 4.25 |
| II | B | 0.12 | 2.5 | 265° C. | 92% | 6.3 |
| III | C | 0.2 | 3.5 | 282° C. | 89% | 3.27 |

The quantity of free radical initiator in wt % in table I is to be understood to be the weight of the pure peroxide fed to the extruder compared to the weight of the polyethylene fed to the extruder, multiplied with 100%.

The quantity of polar monomer in wt % in table I is to be understood to be the weight of the pure monomer fed to the extruder compared to the weight of the polyethylene fed to the extruder, multiplied with 100%.

Polyethylene A was a commercially available low-density polyethylene of the grade SABIC® LDPE 2404N0, having a density of 924 kg/m³ as measured according to ISO 1183-1 (2012), method A, and a melt mass flow rate of 4 g/10 min as measured according to ISO 1131-1 (2011) at a temperature of 190° C. and a load of 2.16 kg, obtainable from SABIC Polyethylene B was a commercially available linear low-density polyethylene of the grade SABIC® LLDPE 43013E, having a density of 930 kg/m³ as measured according to ISO 1183-1 (2012), method A, and a melt mass flow rate of 4.2 g/10 min as measured according to ISO 1131-1 (2011) at a temperature of 190° C. and a load of 2.16 kg, obtainable from SABIC Polyethylene C was a commercially available high-density polyethylene of the grade SABIC® HDPE 0863F, having a density of 963 kg/m³ as measured according to ISO 1183-1 (2012), method A, and a melt mass flow rate of 8 g/10 min as measured according to ISO 1131-1 (2011) at a temperature of 190° C. and a load of 2.16 kg, obtainable from SABIC.

The free radical initiator that was used was a commercially available peroxide having the chemical name cumyl hydroperoxide and CAS registry number 80-15-9, having a half-life time at 260° C. of 5.9 s.

The polar monomer that was used was a commercially available monomer having the chemical name maleic anhydride (MAH) and CAS registry number 108-31-6.

Determination of Conversion

The amount of grafted MAH is measured according to the FTIR and titration method described in "Quantification of Maleic anhydride grafted onto polypropylene by chemical and viscosimetric titrations and FTIR spectroscopy" by M. Sclavons et al. Polymer 41 (2000) 1989-1999.

The conversion is calculated as followed: Total amount of MAH determined by FTIR divided by total amount of MAH fed into the extruder×100%.

Looking at the melt mass flow rate of the materials obtained from examples I and II shows that the addition of a free radical initiator composition according to the present invention does not lead to a change of melt mass flow rate that would have an effect on the processability of the polyethylene materials.

The results of the experiments presented here show that the process of the present invention allows to achieve an amount of grafted polar monomer, such as maleic anhydride, of >3 wt %, with low amount of free, unreacted monomer whilst preferably maintaining or not significantly modifying melt properties such as melt mass flow rate.

The invention claimed is:

1. Process for the production of modified polyethylene comprising adding a free radical initiator composition and a polar monomer to extrusion of polyethylene materials having a melt mass flow rate (MFR) as determined in accordance with ISO 1133-1 (2011) at 190° C. under a load of 2.16 kg of between 0.5 and 75 g/10 min, in an extruder, wherein the free radical initiator composition is added in quantities of between 0.075 wt % and 0.5 wt % compared to the total weight of the polyethylene materials,
wherein the temperature of the polyethylene materials present in the extruder at the position of feeding of the free radical initiator composition is such that the half-life time of a free radical initiator in the free radical initiator composition at that temperature is >5 and <60 seconds,
wherein the half-life time is determined according to the formula I:

$$t_{1/2} = \frac{\ln 2}{A \cdot e^{-\frac{E_a}{R \cdot T}}} \qquad \text{Formula I}$$

in which:
$t_{1/2}$ is the half-life time in s;
A is the Arrhenius frequency factor in $S^{-1}$;
$E_a$ is the activation energy for the dissociation of the initiator in J/mol;
R is the universal gas constant 8.3142 J/(mol·K);
T is the temperature in K,
wherein the half-life time presents the time by which at least half of the molecules of the free radical initiator have decomposed, and
wherein the temperature of the polyethylene materials in the extruder at the position of feeding of the free radical initiator is >180° C. and <300° C.,
wherein the initiator composition consists of an organic peroxide, an azide, an azo compound, or a combination thereof.

2. Process according to claim 1, wherein the temperature of the polyethylene materials present in the extruder at the position of feeding of the free radical initiator is such that the half-life time of the free radical initiator at that temperature is >5 and <30 seconds, wherein the temperature of the polyethylene materials in the extruder at the position of feeding of the free radical initiator is >200° C. and <280° C.

3. Process according to claim 1, wherein the extruder has a length L extending in downstream direction from an inlet where the polyethylene material is fed to the extruder to an outlet where the modified polyethylene is removed from the extruder, wherein the segment between 0.3 L and 1 L, in downstream direction, forms a reaction zone, wherein the temperature of the material in the extruder in the reaction zone is between 230° C. and 350° C., and/or wherein the temperature of the material in the extruder at the outlet is between 230° C. and 350° C.

4. Process according to claim 1 wherein the free radical initiator composition comprises at least one free radical initiator selected from:
    dialkyl peroxides selected from dicumyl peroxide, di(tert-butylperoxyisopropyl)benzene, 2,5-dimethyl-2,5-di(tert-butylperoxy)hexane, tert-butyl cumyl peroxide, 2,5-dimethyl-2,5-di(tert-butylperoxy)hexyne, or di-tert-butyl peroxide;
    cyclic peroxides selected from 3,6,9-triethyl-3,6,9-trimethyl-1,4,7-triperoxononane, or 3,3,5,7,7-pentamethyl-1,2,4-trioxepane; or
    hydroperoxides selected from isopropylcumyl hydroperoxide, 1,1,3,3-tetramethylbutyl hydroperoxide, cumyl hydroperoxide, tert-butyl hydroperoxide, or tert-amyl hydroperoxide;
    and/or mixtures thereof.

5. Process according to claim 1 wherein the free radical initiator composition comprises at least one free radical initiator and a solvent and/or wherein the polar monomer comprises at least one polar monomer and a solvent.

6. Process according to claim 1 wherein the free radical initiator composition is added in quantities between 0.08 wt % and 0.3 wt %, compared to the total weight of the polyethylene material.

7. Process according to claim 1 wherein the free radical initiator composition comprises a free radical initiator having a half-life time at 150° C. of >175 minutes.

8. Process according to claim 1 wherein the extrusion is performed in an extrusion unit, wherein the free radical initiator composition is dosed to the extrusion unit in a stage where the polyethylene material is in a molten condition or in a solid state.

9. Process according to claim 1 wherein the polyethylene material comprises one or more of a low-density polyethylene, a linear low-density polyethylene or a high-density polyethylene, or mixtures thereof.

10. Process according to claim 9 wherein the polyethylene material comprises one or more of a linear low-density polyethylene having a density between 850 kg/m³ and ≤935 kg/m³, a low-density polyethylene having a density of ≥915 kg/m³ and ≤935 kg/m³, a high-density polyethylene having a density of ≥936 kg/m³ and ≤970 kg/m³, or mixtures thereof, the density determined according to ISO 1183-1 (2012), method A.

11. Process according to claim 1 wherein the polyethylene material comprises ≥50%, by weight of a low-density polyethylene, a linear low-density polyethylene or a high-density polyethylene, or mixtures thereof, compared to the total weight of the polyethylene material.

12. Process according to claim 11 wherein the polyethylene material comprises ≥90%, by weight of a low-density polyethylene, a linear low-density polyethylene or a high-density polyethylene, or mixtures thereof, compared to the total weight of the polyethylene material.

13. Process according to claim 1 wherein the temperature of the material in the extruder in the reaction zone and/or the temperature of the material in the extruder at the outlet is between 240° C. and 330° C.

14. Process according to claim 1 wherein the amount of polar monomer is between 0.1 to 10 wt %, with regard to the total weight of the polyethylene material.

15. Process according to claim 14 wherein the amount of polar monomer is between 1 to 7 wt %, with regard to the total weight of the polyethylene material.

16. Process according to claim 1 wherein the polar monomer is a compound according to Formula 1 below:

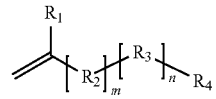

Formula 1 whereby
R₁ is selected from —H or —CH₃;
R₂ is selected from —O—, —(CO)—(NH)— or —(CO)—O—;
R₃ is an organic group comprising 1-30 carbon atoms;
R₄ is —OH, —NH₂, —N(CH₃)₂, —N(CH₂—CH₃)₂, —N[CH(CH₃)₂]₂, —NH[C(CH₃)₃],

—NCO, —CF₃, —CH(CF₃)₂, —(CF₂)ₚ—CF₃, —Si[OSi(CH₃)₃]₃, or —OSi(CH₃)₃,
m=0 or 1; and n ≥1 and ≤10; and p ≥1 and ≤10 or mixtures of two or more of such compounds and/or wherein the polar monomer is selected from an α,β-(3-unsaturated-carboxylic acid with 3 to 8 carbon atoms.

17. Process according to claim 16 wherein R₃ is a linear or branched alkane or —CH₂—CHR₄[O—CH₂—CHR₄]_q—, wherein q ≥1 and ≤10 comprising 1-30 carbon atoms.

18. Process according to claim 1 wherein the polar monomer is maleic anhydride.

19. Process according to claim 1, wherein the polar monomer is maleic acid, fumaric acid, itaconic acid, acrylic acid, methacrylic acid, crotonic acid, or an anhydride, or a mixture of two or more thereof.

* * * * *